United States Patent [19]

de Antonis et al.

[11] 4,362,585
[45] Dec. 7, 1982

[54] UNIAXIALLY ORIENTED NYLON FILM AS CARRIER WEB FOR FIBER REINFORCED PLASTICS

[75] Inventors: Ferdinand A. de Antonis, Fogelsville; Alfieri Degrassi, Pottsville, both of Pa.

[73] Assignee: Allied Corporation, Morris Township, Morris County, N.J.

[21] Appl. No.: 297,647

[22] Filed: Aug. 31, 1981

[51] Int. Cl.³ .................. B29J 5/00; B32B 17/00; B32B 31/00
[52] U.S. Cl. ............................ 156/62.2; 156/205; 156/247; 156/313; 156/324

[58] Field of Search ............ 156/62.2, 62.4, 296, 156/176, 177, 247, 313, 324, 229, 205, 210; 264/109, 288.4, 291

[56] References Cited

U.S. PATENT DOCUMENTS 3,616,130 10/1971 Rogosch et al. ............ 156/324 X
3,788,923 1/1974 Soliman ...................... 156/324 X Primary Examiner—William A. Powell
Attorney, Agent, or Firm—Richard A. Negin

[57] ABSTRACT

The present invention is an improved method of manufacturing fibrous reinforced resin sheet. The improvement is to use a carrier web and/or a top film which is made of uniaxially drawn polyamide.

22 Claims, 2 Drawing Figures

UNIAXIALLY ORIENTED NYLON FILM AS CARRIER WEB FOR FIBER REINFORCED PLASTICS

DESCRIPTION

BACKGROUND OF THE INVENTION

This invention is in the field of fibrous reinforced resin sheets; more particularly, the invention relates to a method of manufacturing fibrous reinforced sheets.

Thermosetting and thermoplastic fibrous reinforced sheets and methods of making them are known in the art. For the purposes of the present invention sheets include fiberglass reinforced mats and panels having flat, corrugated or otherwise formed cross sections in the plane transverse to the longitudinal axis of the sheet being formed. Such fibrous reinforced sheets and methods of their manufacture are described in U.S. Pat. Nos. 3,071,180; 3,072,958; 3,291,878; 3,894,134; and 4,255,217.

Generally the fibrous reinforced resin sheets are made of a crosslinkable resin with crosslinkable polyester being most popular. The fibrous reinforcement can be cut glass fibers. The resin is mixed with a crosslinking agent. Cut glass fibers can be added on a carrier web. The composition is then formed into a sheet and the composition in the sheet is crosslinked. The crosslinking usually takes place at elevated temperatures.

A top film can be placed over the composition on the carrier web prior to forming into a sheet. In this way the fibrous reinforced resin material is in sheet form having the carrier web as an outside layer on one side and the top film as an outside layer on the opposite side. The sheet can then be crosslinked and pressed into a desired configuration. For example, the sheet can be corrugated along its longitudinal axis. Finally, the carrier web and the top film may or may not be removed prior to cutting the sheet to a desirable size.

A problem that has been encountered particularly in crosslinking and/or forming the fibrous reinforced resin sheet has been the maintaining of the dimensional stability of the film in the transverse dimension during heating. Films presently in use tend to shrink in the transverse direction causing the film to wrinkle. This causes wrinkles in the resin sheet and some variation in the sheet thickness. This difficulty has been particularly accentuated when dealing with liquid resins such as unsaturated polyester which are crosslinked under heat or molten thermoplastic resins which are thermoformed.

SUMMARY OF THE INVENTION

In accordance with the present invention a new and improved method of manufacturing fibrous reinforced resin sheet has been found. The improvement is to use a carrier web and/or a top film which is made of uniaxially drawn polyamide.

Briefly, the method of the present invention comprises the steps of feeding a resin, preferably a thermosetting resin such as polyester, a crosslinking agent with the thermosetting resin and a fibrous reinforcement material onto a carrier web. There can be a uniaxially drawn top film layer covering the composition on the carrier web. The drawn direction of the film corresponds to the longitudinal direction of the sheet. The composition on the carrier web is formed into the fibrous reinforced sheet. When the resin material is a thermosetting material it is then crosslinked and formed as desired. When the resin material is a thermoplastic material it is then formed to the desired shape.

In accordance with the present invention, the carrier web and/or top film layers are made of uniaxially drawn polyamide. Preferably the polyamide is polyepsiloncaprolactam or polyhexamethylene adipamide which is drawn to a draw ratio of from 1.5:1 to 6:1, and has a thickness of 0.0004 to 0.005 inches, and more preferably from 0.0005 to 0.002 inches.

The carrier web and/or the top film covering of uniaxially drawn polyamide is tough, dimensionally stable in the transverse direction, and has excellent releasde from the formed sheet.

DESCRIPTION OF THE PREFERRED EMBODIMENTS

The present invention is a new and improved method of manufacturing fibrous reinforced resin sheet. In its most basic form the present invention is the use of uniaxially drawn polyamide film as the carrier web and/or a top film covering layer.

Polyamides suitable for use in the present invention include the long chain polymeric amides having reoccuring amide groups as part of the polymer backbone and preferably a relative formic acid viscosity of from about 50 to about 200 measured in 90 percent formic acid at a concentration of 9.2 weight percent.

Non-limiting examples of such polyamides are:
(a) those prepared by the polymerization of lactams, preferably epsilon-caprolactam (nylon 6);
(b) those prepared by the condensation of a diamine with a dibasic acid, preferably the condensation of hexamethylene diamine with adipic acid (nylon 6,6) and the condensation of hexamethylene diamine with sebacic acid (nylon 6,10);
(c) those prepared by self-condensation of amino acids, preferably self-condensation of 11-aminoundecaoic acid (nylon 11); and
(d) those based on polymerized vegetable oil acids, or random, block, or graph interpolymers consisting of two or more of these polyamides. Preferred polyamides are polyepsiloncaprolactam, polyhexymethylene adipamide, and a copolymer of polyepsiloncaprolactam and polyhexamethylene adipamide.

Also suitable for use herein are polyamide interpolymers comprised of a polyamide and one or more comonomers. Non limiting examples of such comonomers include acrylic or methacrylic acid and/or their derivatives, such as acrylonitrile, acrylamide, methyls, ethyls, propyl, butyl, 2-ethylhexyl, decyl and tridecylesters of acrylic or methyacrylic acid, vinyl esters such as vinyl acetate and vinyl propienate, vinyl aromatic compounds such as styrene, alpha-methyl styrene, and vinyl toluenes and vinyl ethers such as vinyl isobutyl ether.

It is further noted that the aforementioned polyamides containing various terminal functionality are also suitable for use in the present invention. Preferred are polycaprolactams (nylon 6) containing, (a) a carboxylic group attached to both ends of the polymer chain, (b) a carboxyl group attached to one end and an acetamide group attached to the other end of the polymer chain, (c) an amino group attached to both ends of the polymer chain and (d) a carboxyl group attached to one end and an amino group attached to the other end of the polymer chain. Particularly preferred is (d) above, a polycaprolactam having a carboxyl group attached to one end and an amino group attached to the other end of the polymer chain.

The nylon of the present invention may be modified by one or more conventional additives such as stabilizers and inhibitors of oxidative, thermal, and ultraviolet light degradation; lubricants, plasticizers and mold release agents including dyes from pigments.

Figure 1:
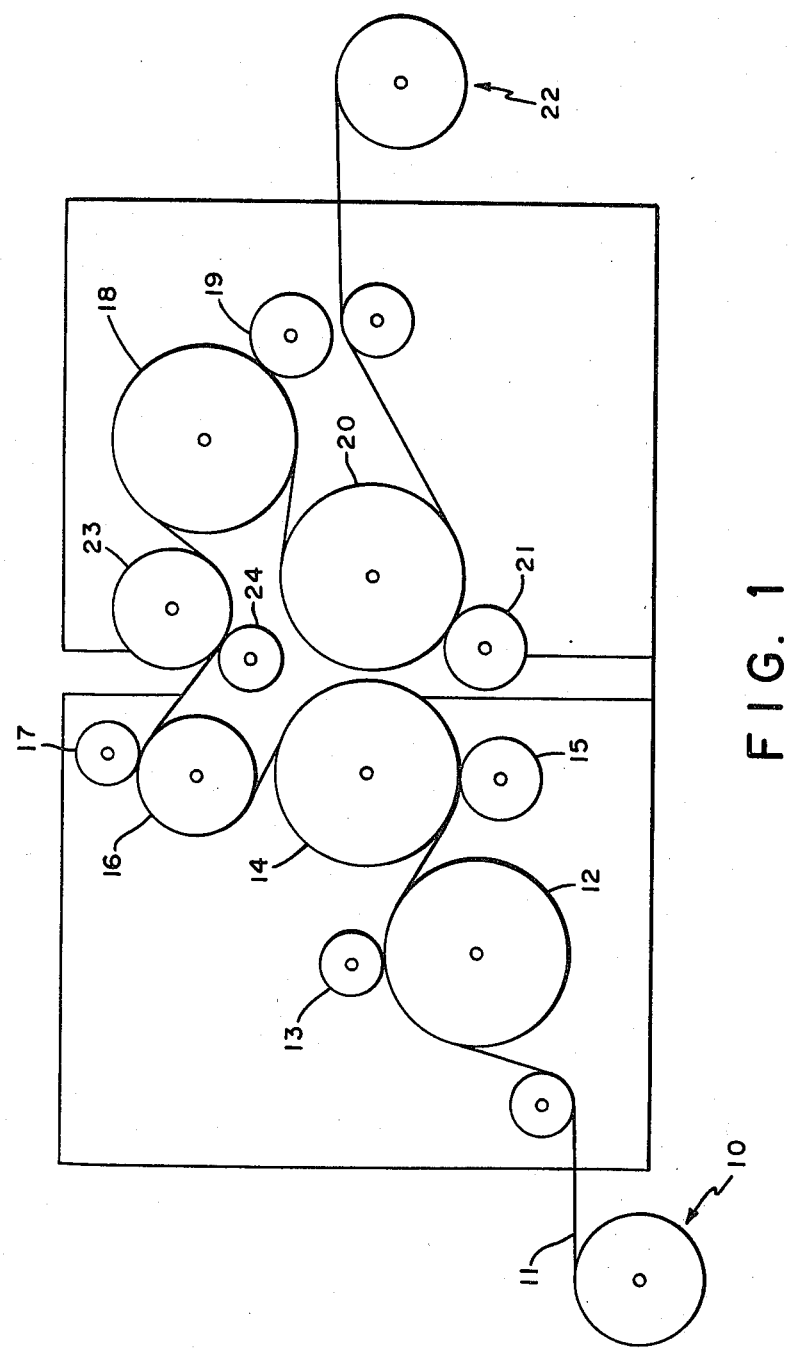
FIG. 1 is a schematic diagram of an apparatus for longitudinally stretching film.

The nylon composition of the present invention can be formed into a film by conventional thermal forming methods such as extrusion and casting. The nylon film can then be uniaxially drawn by means known in the art. Preferably, for use in the present invention, the polyamide film is drawn to a draw ratio of 1.5:1 to 6:1. For the purposes of the present invention the term draw ratio is an indication of the increase in the dimension in the direction of draw. Therefore nylon film having a draw ratio of 2:1 has its length doubled during the drawing process. Generally, the polyamide is drawn by passing it over a series of preheating and heating rolls. The heated polyamide moves through a set of nip rolls downstream at a faster rate than the film entering nip rolls at an upstream location. The change of rate is compensated for by stretching in the polyamide film. FIG. 1 shows a schematic drawing of a series of rollers used to uniaxially stretch nylon film.

Referring to FIG. 1 there is a roll of undrawn nylon film at the unwinding station 10. The nylon film passes through the uniaxially drawing roller set. The nylon film 11 is unwound and passes between preheated roller 12 and preheat nip roll 13, and then between second preheated roller 14 and second preheat nip roll 15. The nylon film is initially drawn through slow stretch roll 16 and its corresponding slow stretch roll nip 17. The nylon film then passes between fast stretch roll 23 and fast stretch nip roll 24. The nylon film then passes over heat set roll 18 and between heat set roll 18 and heat set nip roll 19. The nylon film 11 then passes over chill roll 20 and between chill roll 20 and chill roll nip roll 21, and finally to wind up station 22.

The polyamide is preheated as it passes over the preheating rolls. Preferably, there are two preheating rolls. The polyamide is preheated to from 250° F. to 325° F. The preheating rolls rotate at the same speed so that there is no stretching. The heat set roll 18 is heated to a temperature of from 325° F. to about 400° F. The slow stretch roll 16 rotates at the same speed as the preheating rolls so that there is no stretch between the slow stretch rolls and the preheating rolls. The film then passes over and is drawn by fast stretch roll 23. For example, for a draw ratio of 4:1 the fast stretch roll 23 would rotate four times faster than slow stretch roll 16. It is between the fast stretch roll 23, and the nip of slow stretch roll 16 and slow stretch nip roll 17 that orientation of the polymer molecules takes place, and the drawing of the film. The heat set roll 18 rotates at a speed which is slightly slower than the fast stretch roll 23 depending on the draw ratio which is desired. As the film passes over the heat set roll 18 it becomes heat set and it relaxes (anneals). The film then leaves the heat set roll 18 and passes over chill roll 20 and between chill roll 20 and chill roll nip 21. The chill rolls are heated to from 100° to 250° F. The chilling roll steps down the cooling so that no low temperature stresses are induced in the film. The uniaxially drawn polyamide film so produced is dimensionally stable in the transverse direction. The preferred uniaxially drawn nylon film has a draw ratio of from 1.5:1 to 6:1, with a draw ratio of 3:1 to 5:1 preferred. Uniaxially drawn film used in the present invention is from 0.0004 inches to 0.005 inches thick, preferably 0.0005 to 0.002 inches thick.

Figure 2:
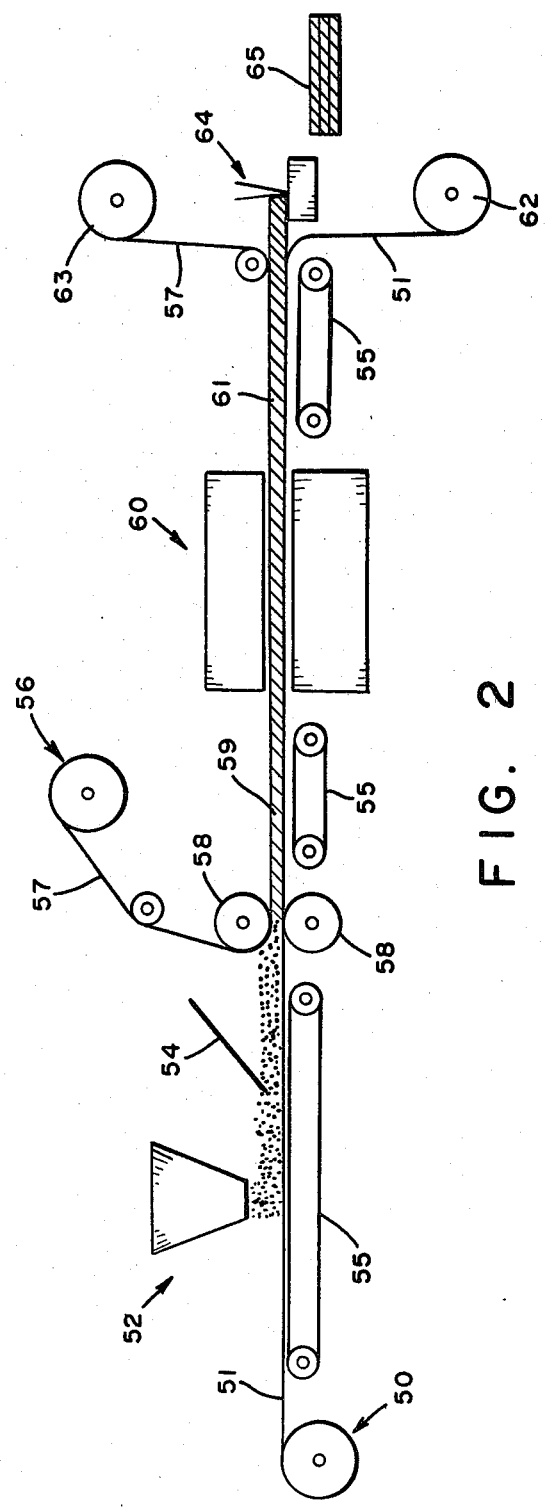
FIG. 2 is a schematic diagram of one embodiment of apparatus which can be used to illustrate an embodiment of the method of manufacture of the present invention using both a carrier web and a top film covering.

The uniaxially drawn polyamide film of the present invention can be used to improve methods of manufacturing fiberglass resin sheet. Representative of methods which can be improved by using the uniaxially drawn nylon film of the present invention are those described in U.S. Pat. Nos. 4,255,217; 3,894,134; 3,291,878; and 3,072,958. FIG. 2 illustrates a schematic apparatus for use in manufacturing of fibrous reinforced resin sheet by methods of the present invention. The use of the apparatus of FIG. 2 and the methods described therewith are for illustrative purposes only and not intended to limit the scope of the present invention. FIG. 2 is an apparatus which is of the type used to make reinforced thermosetting resin sheets. However, one skilled in the art could readily adapt the method of the present invention to fibrous reinforced thermoplastic resin sheets.

In accordance with the apparatus shown in FIG. 2, carrier web 51 is unwound from carrier web roll 50 and continuously fed onto conveyor means such as conveyor belt system 55. The thermosetting resin composition 53 such as a polyester composition including a crosslinking agent and fibrous reinforcing material such as cut fiberglass are continuously fed onto carrier web 51 from a suitable mixing and dispensing means 52. Alternatively, the fibrous reinforcing material can be fed onto carrier web 51 at a separate location from the resinous composition. The fibrous reinforced resin composition deposited on carrier web 51 can be uniformly spread thereover as it passes under the doctor blade 54.

The resin formulation containing the fibrous reinforcing material is then covered with top film 57 from top film roll 56. The top film 57 covers the resinous composition which is supported by carrier web 51. Thereby, a sandwich of the fibrous reinforced resin sheet is formed between top film 57 and carrier web 51. The sandwich passes between compacting rollers 58 which compact the fibrous reinforced resin material between the top film and the carrier web to a desired thickness. The compacted sheet 59 then moves to a oven 60 where it is crosslinked. In the case of thermoplastic resin as in the case of thermosetting resin additional forming to form shapes such as corrugations as illustrated in U.S. Pat. No. 3,071,180 can take place before compacted sheet 59 enters oven 60 or within oven 60. In oven 60 the compacted sheet is heated to the crosslinking temperature. The use of uniaxially drawn nylon as the top sheet 57 and the carrier web 51 assures dimensional stability in the transverse direction. This prevents surface defects in the sheet and helps to maintain a constant thickness. A sheet of uniform thickness and a defect free surface has the advantage of good appearance as well as uniform and higher physical property values. Additionally, when the sheet is formed into shapes such as corrugated panel, as discussed above, a uniform consistent forming process can take place. The crosslinked and formed sheet 61 then leaves oven 60. The carrier web 51 can be removed from the formed sheet 61 and wound onto carrier web windup roll 62; and the top film 52 can be removed from the top of the formed sheet 61 and wound onto top film woundup roll 63. Alternatively, the carrier web 51 and top film 57 can remain with the formed sheet 61 and move on to the next step. The formed sheet 61 can then be cut to desired size at cutter 64 which can be a saw or any suitable cutting means. The cut sheets 65 are then collected. Alternately, the compacted sheet can be partially crosslinked and wound up on a roll for later use.

It is noted that in some processes a top film alone made from the uniaxially drawn nylon of the present invention can be used; in other processes the top film and the carrier web can be made of the uniaxially drawn nylon; and finally in some processes only the carrier web would be made of uniaxially drawn nylon.

For example where the temperature at the base of the sheet in the oven is too high it might be desireable only to have the top film made of the uniaxially drawn nylon. The resin and fiber are fed onto a carrier means such as a conveyor belt, or carrier web other than uniaxially drawn nylon film. Where the top of the sheet is being subjected to a separate decorating or treating step only the bottom or carrier web of uniaxially drawn nylon may be used.

As noted the method of the present invention can be used in the manufacture of fibrous reinforced resin sheet made of compositions disclosed in the patents listed in the background of the invention. Included in the materials which can be used are polyvinyl chloride compositions, epoxys, polyurethanes, polyesters and other thermoplastic and thermosetting materials. However the most common and preferred use of the present invention is with fibrous reinforced polyester sheets. The polyester can be thermoplastic or thermosetting type polyester, such as described in U.S. Pat. No. 3,894,134. During the processing the oven 60 is heated to from 200° F. to 400° F. At these temperatures it is important that the carrier web not deform or be thermally unstable.

The following Examples are set forth below to illustrate the nature of the invention and method of carrying it out. However, the invention should not be considered as being limited to the details thereof.

EXAMPLE 1

This Example illustrates the preparation of uniaxially oriented film useful as carrier web and/or top film in a process to make fiberglass reinforced thermosetting polyester by a process such as described in the above specification.

Allied Corporation CAPRON ® 8207 nylon 6 pellets were used. The relative formic acid viscosity was 73 measured in 90 percent formic acid at a concentration of 9.2 percent by weight. The nylon 6 pellets were fed into a 4½ inch diameter, 30:1 L/D ratio single screw extruder with a 90 inch wide flat film die. The extruder conditions were as follows: Barrel Zone 1—520° F., Zone 2—530° F., Zone 3—505° F., Zone 4—500° F., Zone 5—495° F.; Adapter—500° F.; Die Zone 1—510° F., Zone 2—505° F., Zone 3—505° F., Zone 4—505° F., Zone 5—510° F. The screw speed was 80 revolutions per minute and the output was about 500 pounds per hour.

The film was extruded onto a chill roll maintained at about 180° F. where it was drawn to 3 mils. (0.003 inches) thick and then wound. This film is characterized as being nonoriented. The 3 mil nylon 6 film was trimmed to 80 inches in width for use in making the uniaxially oriented film of the present invention.

The film was uniaxially oriented using an apparatus of the type illustrated in FIG. 1. Reference characters relate to those in FIG. 1.

The film (0.003 inches thick) was passed over two preheating rolls 13, 14, heated to 300° F. The heated film was then passed over the first slow stretch roll 16 which was heated to 275° F. The slow stretch roll 16 and preheating rolls rotated at an equal speed of 25 feet of film per minute. The heated film was then passed over a fast stretch roll 23 heated to 350° F., which ran at a speed four times greater than the slow stretch roll 16, 100 feet of film per minute. Stretching and orientation took place between fast stretch roll 23 and slow stretch roll 16. The film then passed over a heat set roll 18, also heated to 350° F., which ran approximately 5% slower than the fast stretch roll. The film was heat set and relaxed (annealed). The film than passed over a cooling roll, heated to 200° F., to lock in the high temperature annealing so that no low temperature stresses are induced in the film. The uniaxially oriented film was about 75 inches wide and was trimmed to 70 inches width for further use.

The result was a dimensionally stable uniaxially oriented 0.75 mil (0.00075 inches thick) film, properly suited for the fiberglass reinforced polyester sheet process as a flat removable carrier web.

EXAMPLE 2

The film made in Example 1 (0.00075 inches thick) was tested for physical properties, including dimensional stability. The film was compared against unoriented film made of CAPRON ® 8207 in a manner similar to the unoriented film in Example 1. The unoriented film of Comparative 1 had a thickness of 1 mil (0.001 inches). A second Comparative was 1 mil thick biaxially oriented film produced by Unitika Ltd. of Japan as EMBLEM ™ biaxially oriented nylon 6 film. The properties of EMBLEM film are from published data. The physical properties are summarized in the Physical Property Table below. Results are reported per mil (0.001) of film thickness to make the results comparable; results are reported in the Machine Direction (MD) or drawn direction and in the Transverse Direction (TD). Dimensional Stability was measured as the percent change in dimension of a 10 inch by 10 inch film square heated at a given temperature for ten minutes.

| Property | PHYSICAL PROPERTY Direction | Ex. 2 | Comp. 1 | Comp. 2 | Test |
|---|---|---|---|---|---|
| Thickness (inches) | | 0.00075 | 0.001 | 0.001 | — |
| Tensile Modulus (PSI) | MD | 321,000 | 100,000 | 200,000 | ASTM |
| | TD | 311,000 | 100,000 | 250,000 | D882 |
| Tensile Strength (PSI) | MD | 50,000 | 14,000 | 28,000 | ASTM |
| | TD | 8,000 | 14,000 | 30,000 | D882 |
| Maximum Elong. (%) | MD | 39 | 350–400 | 80 | ASTM |
| Maximum | TD | 290 | 350–400 | 120 | D882 |
| Tensile Strength (PSI) | MD | 28,000 | 5,500 | — | ASTM |
| | TD | 8,000 | 5,500 | — | D882 |
| Yield Point Elong. (%) | MD | 13 | 10 | — | ASTM |
| Yield Point | TD | 9 | 10 | — | D882 |
| Tear Test | MD | 180 | 65 | 20 | ASTM |

-continued

| Property | Direction | Ex. 2 | Comp. 1 | Comp. 2 | Test |
|---|---|---|---|---|---|
| (gms/layer) Elmendorf | TD | 60 | 65 | 30 | D1922 |
| Tear Test | MD | 1,360 | 700 | 300 | ASTM |
| (gms/mil) Graves | TD | 678 | 650 | 500 | D1004 |
| Water Vapor Trans. Rate gms/100cc/24hrs (100° F., 97% RH) | | 30 | 12 | 17 | ASTM E96-66 |
| Dimensional Stability (%) | | | | | |
| 10 min, 350° F. | MD | −5.0 | 10 | 5 | |
| | TD | −0.3 | 10 | 4 | |
| 10 min, 300° F. | TD | −0.3 | 2.0 | — | |
| 10 min, 400° F. | TD | −0.3 | 10.0 | — | |

The properties summarized in the Physical Properties Table show that the uniaxially oriented film of the present invention maintains dimensional stability in the transverse direction. It is more dimensionally stable in the transverse direction than unoriented or biaxially oriented nylon film. It is, therefore, particularly useful in the improved method of the present invention.

What is claimed is:

1. In a method of manufacturing fibrous reinforced resin sheet, of the type wherein a composition comprising a resin and fibrous reinforcement is fed onto a carrier web, the composition is formed into a sheet, the improvement comprising the carrier web being a uniaxially drawn polyamide film.

2. The method as recited in claim 1 wherein a further improvement is the step of covering the composition on the carrier web with a top film of uniaxially drawn polyamide.

3. The method as recited in claims 1 or 2 wherein the resin is a curable polyester resin and the formulation further comprises a crosslinking agent, and the method further comprises the step of crosslinking the resin.

4. The method as recited in claim 3 wherein the fibrous reinforced is chopped glass fibers.

5. The method as recited in claim 3 wherein the monoaxially drawn nylon has a draw ratio of from 1.5:1 to 6:1.

6. The method as recited in claim 5 wherein the uniaxially drawn film is from 0.0004 inches 0.005 inches thick.

7. The method as recited in claim 5 wherein the uniaxially drawn film is from 0.0001 inches to 0.002 inches thick.

8. The method as recited in claim 3 wherein the composition is crosslinked at from 200° F. to 400° F.

9. The method as recited in claim 3 wherein a further improvement is using an embossed uniaxially drawn polyamide film.

10. The method as recited in claim 3 wherein the polyamide is selected from the group consisting of polyepsilon caprolactam and polyhexamethylene adipamide.

11. A method of manufacturing fiberglass reinforced resin sheet comprising the steps of:
feeding a resin, a crosslinking agent and fibrous reinforcement onto a uniaxially drawn polyamide carrier web;
forming the composition into a sheet; and crosslinking the composition in the sheet.

12. The method as recited in claim 11 further comprising the step of covering the composition on the carrier roll with a top film of uniaxially drawn polyamide.

13. The method as recited in claims 11 or 12 wherein the resin is a curable polyester resin.

14. The method as recited in claim 13 wherein the fibrous reinforcement is chopped glass fibers.

15. The method as recited in claim 13 wherein the uniaxially drawn nylon has a draw ratio of from 1.5:1 to 6:1.

16. The method as recited in claim 15 wherein the uniaxially drawn film is from 0.0004 inches to 0.005 inches thick.

17. The method as recited in claim 15 wherein the uniaxially drawn film is from 0.0005 inches to 0.002 inches thick.

18. The method as recited in claim 13 wherein the composition is crosslinked at from 200° F. to 400° F.

19. The method as recited in claim 13 wherein a further improvement of using an embossed uniaxially drawn polyamide film.

20. The method as recited in claim 13 wherein the polyamide is selected from the group consisting of polyepsilon caprolactam and polyhexamethylene adipamide.

21. In a method of manufacturing fibrous reinforced resin sheet, of the type wherein a composition comprising a resin and fibrous reinforcement is fed onto a carrier means, the composition is covered with a top film and the composition is formed into a sheet, the improvement comprising the top film being a uniaxially drawn polyamide film.

22. The method as recited in claim 21 wherein the composition further comprises a crosslinking agent, and the method further comprises the step of cross-linking the resin in the sheet.

* * * * *